(12) United States Patent
Garzon Aztatzi (10) Patent No.: US 12,485,820 B2
(45) Date of Patent: Dec. 2, 2025

(54) SYSTEMS AND METHODS FOR DETECTING ROAD OBSTRUCTIONS

(71) Applicant: Ford Global Technologies, LLC, Dearborn, MI (US)

(72) Inventor: Jazael Garzon Aztatzi, Cuatitlan Izcalli (MX)

( * ) Notice: Subject to any disclaimer, the term of this patent is extended or adjusted under 35 U.S.C. 154(b) by 227 days.

(21) Appl. No.: 18/333,548

(22) Filed: Jun. 13, 2023

(65) Prior Publication Data

US 2024/0416839 A1   Dec. 19, 2024

(51) Int. Cl.
| | |
|---|---|
| *B60R 1/28* | (2022.01) |
| *B60Q 9/00* | (2006.01) |
| *B62D 15/02* | (2006.01) |
| *G06V 20/56* | (2022.01) |
| *G06V 20/58* | (2022.01) |
| *G08G 1/16* | (2006.01) |

(Continued)

(52) U.S. Cl.
CPC ............... *B60R 1/28* (2022.01); *B60Q 9/008* (2013.01); *B62D 15/0215* (2013.01); *G06V 20/58* (2022.01); *G06V 20/588* (2022.01); *G08G 1/16* (2013.01); *H04N 7/183* (2013.01); *H04N 7/188* (2013.01); *H04N 23/695* (2023.01); *B60R 2300/101* (2013.01); *B60R 2300/20* (2013.01); *B60R 2300/802* (2013.01); *B60R 2300/8093* (2013.01)

(58) Field of Classification Search
None
See application file for complete search history.

(56) References Cited

U.S. PATENT DOCUMENTS

| | | |
|---|---|---|
| 10,373,378 B2 | 8/2019 | Harbach et al. |
| 2016/0379411 A1* | 12/2016 | Harbach ................ H04N 23/63 |
| | | 345/633 |

(Continued)

FOREIGN PATENT DOCUMENTS

| | | | |
|---|---|---|---|
| CN | 110851770 A | * | 2/2020 |
| CN | 109427199 B | | 11/2022 |
| KR | 20120041583 A | * | 5/2012 |

OTHER PUBLICATIONS

Jana Skirnewskaja et al., Automotive Holographic Head-up Displays, Advanced Materials, Feb. 11, 2022, pp. 1-26.

(Continued)

*Primary Examiner* — Jelani A Smith
*Assistant Examiner* — Davin Seol
(74) *Attorney, Agent, or Firm* — Emily Drake; Eversheds Sutherland (US) LLP (57) ABSTRACT

A vehicle having a camera disposed at a vehicle front portion is disclosed. The camera may be configured to capture images of a geographical area that may be occluded from a driver field of view caused by presence of a vehicle vertical body-mounted pillar when the vehicle traverses a road curve. The vehicle may further include a processor configured to obtain a trigger signal and activate the camera responsive to obtaining the trigger signal. The processor may be further configured to obtain the images from the camera and determine a road obstruction presence in the geographical area based on the obtained images. The processor may output a visual alert notification or an audible alert notification responsive to determining the road obstruction presence.

12 Claims, 6 Drawing Sheets

(51) Int. Cl.
    *H04N 7/18*          (2006.01)
    *H04N 23/695*      (2023.01)

(56) References Cited

U.S. PATENT DOCUMENTS

| | | | |
|---|---|---|---|
| 2017/0076606 A1* | 3/2017 | Gupta | B60Q 9/008 |
| 2017/0246991 A1* | 8/2017 | Harter | H04N 23/634 |
| 2019/0315275 A1* | 10/2019 | Kim | B60J 1/02 |
| 2019/0384304 A1 | 12/2019 | Towal et al. | |
| 2021/0118161 A1* | 4/2021 | Stein | G06V 10/82 |
| 2021/0120158 A1* | 4/2021 | Shabtay | H04N 23/611 |
| 2021/0309248 A1 | 10/2021 | Choe et al. | |
| 2024/0062655 A1* | 2/2024 | Elimalech | G08G 1/161 |

OTHER PUBLICATIONS

Monirul Islam Pavel, et al., Vision-Based Autonomous Vehicl Systems Based on Deep Learning: A Systematic Literature Review, MDPI, Applied Sciences, Jul. 6, 2022, pp. 1-51.

* cited by examiner

SYSTEMS AND METHODS FOR DETECTING ROAD OBSTRUCTIONS

FIELD

The present disclosure relates to systems and methods for detecting road obstructions and more particularly to systems and methods for detecting road obstructions in blind spots when a vehicle traverses a road curve.

BACKGROUND

Driving on curvy roads may be challenging for many drivers. A driver's awareness of the vehicle surroundings may be affected if the road obstacles are present in views occluded from a driver's field of view.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a vehicle configured to determine a road obstruction presence on a road curve. Specifically, the present disclosure describes a vehicle that may be configured to determine the road obstruction presence in a geographical area in front of the vehicle that may be occluded from a driver's field of view (FOV) due to presence of a vehicle vertical body-mounted pillar when a driver navigates the road curve. The vehicle may include a camera that may be disposed at a vehicle top front right portion (e.g., at a top right portion of a vehicle front windshield) that may be configured to capture geographical area images in front of the vehicle occluded from the driver's FOV (i.e., "blind spot"). The camera may be a one degree of freedom rotational camera that may be configured to rotate laterally based on inputs received from the vehicle. The vehicle may activate the camera when the driver rotates the vehicle steering wheel in a predefined direction (e.g., a counterclockwise direction) or when the driver actuates a camera actuator. Responsive to camera activation, the vehicle may obtain the images captured by the camera and may analyze the images to determine the road obstruction presence. The vehicle may output an alert responsive to determining the road obstruction presence, thereby enabling the driver to perform a remedial action (e.g., apply brakes) on time.

In some aspects, the vehicle may analyze the images captured by the camera to determine the road obstruction presence by using one or more Artificial Intelligence (AI) based image processing algorithms that may be pre-stored in a vehicle memory. In further aspects, the vehicle may be configured to detect a road curve end in the images captured by the camera by using the AI-based image processing algorithm and control camera rotation based on the detected road curve end. Specifically, the vehicle may control the camera rotation such that the camera focuses on or "follows" the road curve end when the vehicle traverses the road curve. The vehicle may further include a display screen in a vehicle cockpit on which the vehicle may display the images captured by the camera.

The vehicle may be further configured to generate an Augmented Reality (AR) image by overlaying a visual alert notification on the images captured by the camera, responsive to determining the road obstruction presence. The vehicle may render the generated AR image on the display screen, so that the driver may conveniently view the visual alert notification on the AR image and perform timely remedial actions. The vehicle may be further configured to output an audible alert notification via a vehicle speaker system responsive to determining the road obstruction presence.

The present disclosure discloses a vehicle that assists the driver in determining obstruction presence in a blind spot and performing timely remedial actions. The vehicle uses vehicle camera to determine obstruction presence in the blind spot, thereby eliminating requirement of using any external systems/servers to detect obstruction presence. The vehicle further outputs an alert responsive to determining the obstruction presence, thereby assisting the driver in preventing adverse situations.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
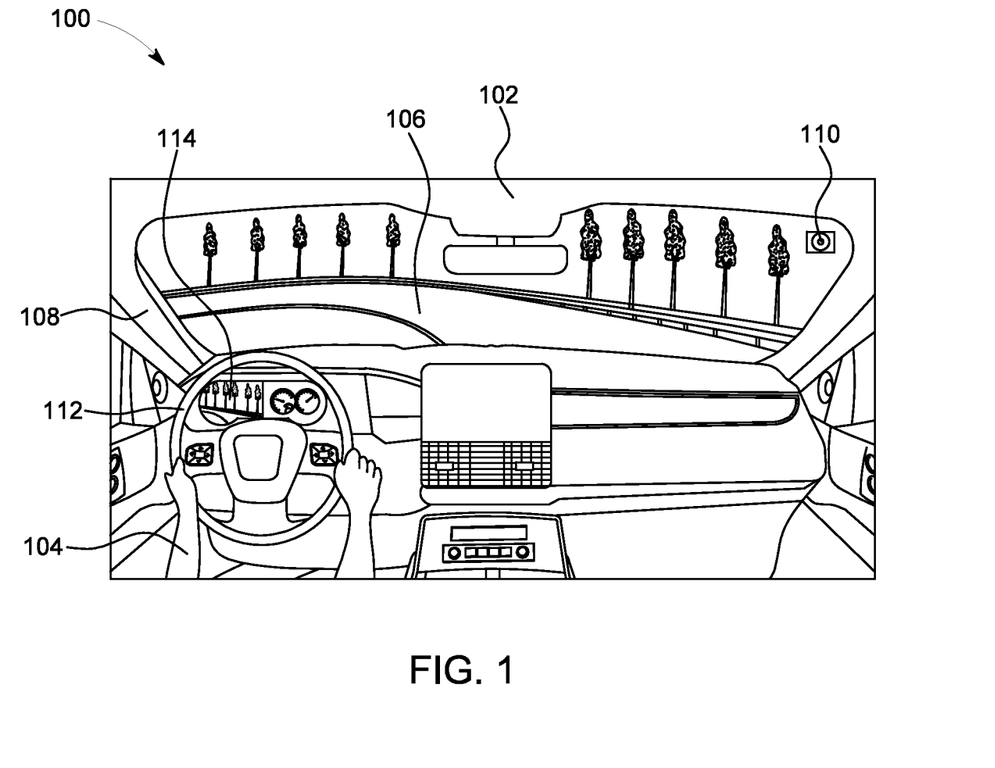
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 102 that may take the form of any passenger or commercial vehicle such as, for example, a car, a work vehicle, a crossover vehicle, a truck, a van, a minivan, a taxi, a bus, etc. The vehicle 102 may be a manually driven vehicle, and/or may be configured to operate in a partially autonomous mode, and may include any powertrain such as, for example, a gasoline engine, one or more electrically-actuated motor(s), a hybrid system, etc. A vehicle user 104 (or a driver 104) may be driving the vehicle 102 on a road 106. More specifically, the vehicle 102 may be traversing a road curve (or curve 106). Hereinafter, the road 106 and the curve 106 are interchangeably used in the present disclosure.

In some aspects, when the vehicle 102 may be traversing the curve 106, some parts of the curve 106 may be obstructed from driver's field of view (FOV) due to presence of one or more vehicle structural components. For example, as shown in FIG. 1, a vehicle vertical body-mounted pillar 108 may be obstructing driver's FOV when the vehicle 102 may be traversing a left-side curve and the vehicle 102 may be a left-hand drive vehicle. The vertical body-mounted pillar 108 may be disposed at vehicle's left portion. A person ordinarily skilled in the art may appreciate that a similar vertical body-mounted pillar on vehicle's right portion may obstruct driver's FOV when the vehicle 102 may be traversing a right-side curve and the vehicle 102 may be a right-hand drive vehicle.

To facilitate the driver 104 conveniently navigate the curve 106, the vehicle 102 may include a camera 110 that may be disposed at a vehicle top right portion (or vehicle top left portion if the vehicle 102 is a right-hand drive vehicle). The camera 110 may be a one degree of freedom rotational camera that may be configured to rotate laterally based on inputs received from the vehicle 102 or one or more external devices (e.g., servers, user devices, etc.). For example, the camera 110 may rotate left-to-right or vice-versa based on inputs received from the vehicle 102 or the external devices. In the exemplary aspect shown in FIG. 1, the camera 110 may be disposed on vehicle front windshield.

When the driver 104 navigates the curve 106 and rotates a vehicle steering wheel 112 (or steering wheel 112) in an anticlockwise direction (or a clockwise direction when the vehicle 102 may be a right-hand drive vehicle), the vehicle 102 may activate the camera 110. In addition to camera activation, the vehicle 102 may cause the camera 110 to continuously focus on end of the curve 106 and rotate (while focusing on the curve end) as the vehicle 102 traverses the curve 106. The vehicle 102 may further obtain the images captured from the camera 110 and display the images at a display screen 114 that may be disposed in a vehicle cockpit.

The images captured by the camera 110 may be of a geographical area in front of the vehicle 102 that may be occluded from the driver FOV due to presence of the vertical body-mounted pillar 108 (as the camera 110 focuses on the curve end). Therefore, the images displayed on the display screen 114 may enable the driver 104 to conveniently view those portions of the curve 106 that may be occluded from driver's FOV (or "blind spot"), thereby facilitating the driver 104 to efficiently navigate the curve 106.

In additional aspects, the vehicle 102 may determine presence of one or more obstructions or obstacles on the curve 106 (specifically, obstacles present in the blind spot), based on the images obtained from the camera 110. Responsive to determining an obstruction presence, the vehicle 102 may output an audible alert and/or a visual alert on the display screen 114. The driver 104 may perform one or more remedial actions (e.g., decrease vehicle speed, apply brakes, stop the vehicle 102, and/or the like) responsive to hearing/viewing the alert. In this manner, the vehicle 102 indicates the obstruction presence in the blind spot to the driver 104 in a timely manner, so that the driver 104 may perform remedial actions on time.

Further details of the vehicle 102 are described below in conjunction with FIG. 2.

The vehicle 102 and/or the driver 104 implement and/or perform operations, as described here in the present disclosure, in accordance with the owner manual and safety guidelines.

Figure 2:
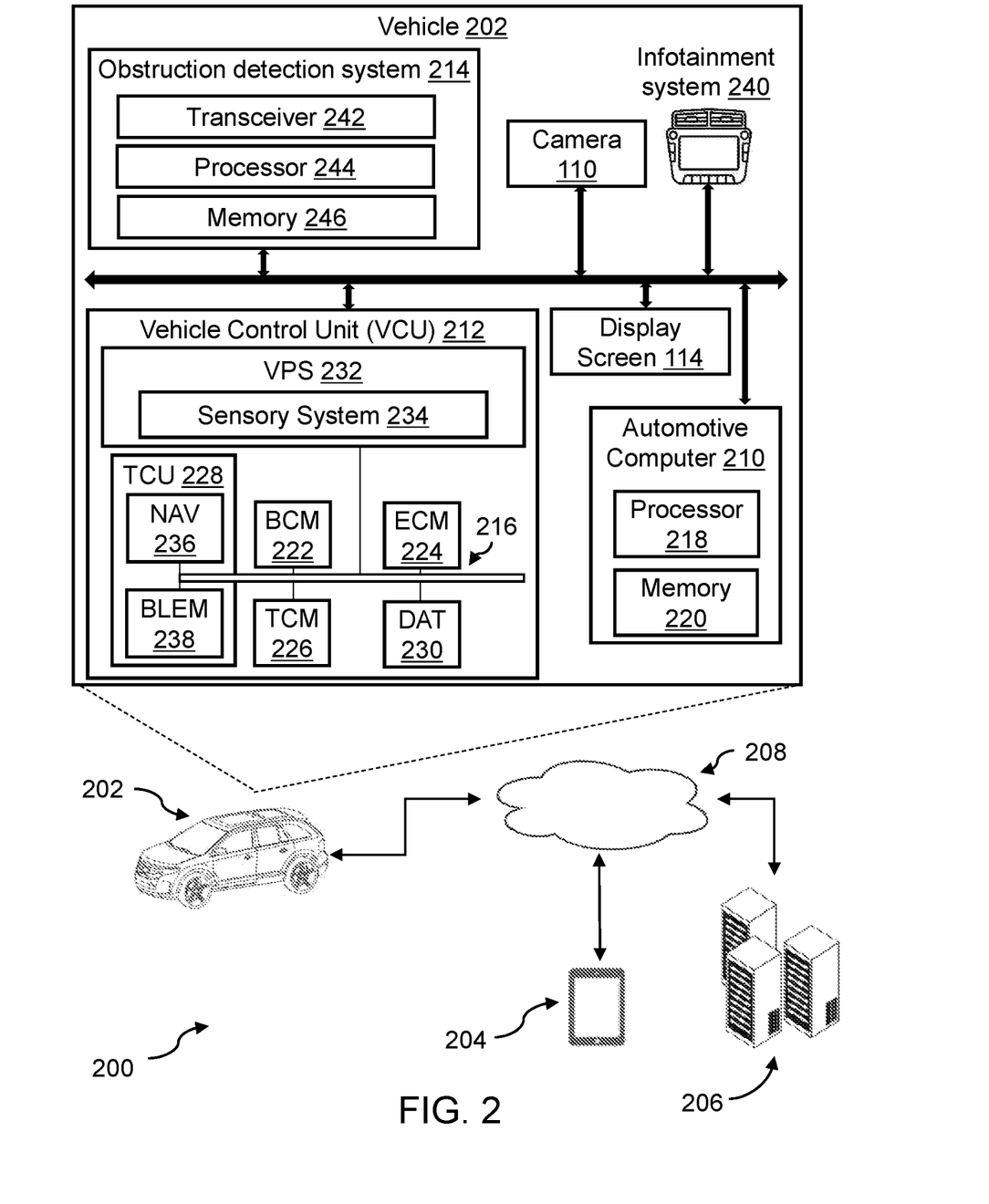
FIG. 2 depicts a block diagram of an example system for detecting road obstructions in accordance with the present disclosure.

FIG. 2 depicts a block diagram of an example system 200 for detecting road obstructions in accordance with the present disclosure. While describing FIG. 2, references may be made to FIGS. 3, 4 and 5.

The system 200 may include a vehicle 202, a user device 204, and one or more servers 206 communicatively coupled with each other via one or more networks 208. The vehicle 202 may be same as the vehicle 102 described in conjunction with FIG. 1. The user device 204 may be associated with the driver 104, and may include, but is not limited to, a mobile phone, a laptop, a computer, a tablet, a wearable device, or any other similar device with communication capabilities. The server(s) 206 may be part of a cloud-based computing infrastructure and may be associated with and/or include a Telematics Service Delivery Network (SDN) that provides digital data services to the vehicle 202 and other vehicles (not shown in FIG. 2) that may be part of a commercial vehicle fleet. In further aspects, the server(s) 206 may store and provide one or more Artificial Intelligence (AI) based image processing algorithms to the vehicle 202 that may facilitate the vehicle 202 to analyze an image and determine one or more objects that may be present in the image. For example, the server(s) 206 may provide AI-based image processing algorithms to the vehicle 202 that may facilitate the vehicle 202 to analyze road curve images obtained from the camera 110 and determine presence one or more obstructions or obstacles on the curve 106 based on image analysis.

The network(s) 208 illustrates an example communication infrastructure in which the connected devices discussed in various embodiments of this disclosure may communicate. The network(s) 208 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 210, a Vehicle Control Unit (VCU) 212, and an obstruction detection system 214. The VCU 212 may include a plurality of Electronic Control Units (ECUs) 216 disposed in communication with the automotive computer 210.

The user device 204 may connect with the automotive computer 210 and/or the obstruction detection system 214 via the network 208, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

In some aspects, the automotive computer 210 and/or the obstruction detection system 214 may be installed in a vehicle engine compartment (or elsewhere in the vehicle 202), in accordance with the disclosure. Further, the automotive computer 210 may operate as a functional part of the obstruction detection system 214. The automotive computer 210 may be or include an electronic vehicle controller, having one or more processor(s) 218 and a memory 220. Moreover, the obstruction detection system 214 may be separate from the automotive computer 210 (as shown in FIG. 2) or may be integrated as part of the automotive computer 210.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure. The memory 220 may be a non-transitory computer-readable memory storing an obstruction detection program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 212 may share a power bus with the automotive computer 210 and may be configured and/or programmed to coordinate the data between vehicle systems, connected servers (e.g., the server(s) 206), and other vehicles (not shown in FIG. 2) operating as part of a vehicle fleet. The VCU 212 can include or communicate with any combination of the ECUs 216, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 212 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, door sensors, proximity sensors, temperature sensors, wheel sensors, ambient weather sensors, vehicle internal and external cameras, steering wheel sensors, etc. In an exemplary aspect, the steering wheel sensors may be configured to detect rotation direction and angle of the steering wheel 112 when the driver 104 rotates the steering wheel 112. For example, the steering wheel sensors may detect when the driver 104 rotates the steering wheel 112 in clockwise or anticlockwise direction. The steering wheel sensors may be further configured to transmit signals (e.g., trigger signals) to one or more processors, e.g., the processor 218 (or a processor 244, described below), indicating steering wheel rotation direction, when the driver 104 rotates the steering wheel 112.

In some aspects, the VCU 212 may control vehicle operational aspects and implement one or more instruction sets received from the user device 204, from one or more instruction sets stored in the memory 220, including instructions operational as part of the obstruction detection system 214.

The TCU 228 may be configured and/or programmed to provide vehicle connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication (including cellular communication) between the vehicle 202 and other systems (e.g., a vehicle key fob, not shown in FIG. 2), computers, and modules. The TCU 228 may be disposed in communication with the ECUs 216 by way of a bus.

The ECUs 216 may control aspects of vehicle operation and communication using inputs from human drivers, inputs from an autonomous vehicle controller, the obstruction detection system 214, and/or via wireless signal inputs received via the wireless connection(s) from other connected devices, such as the user device 204, the server(s) 206, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s) including the camera 110, audio system(s), speakers, wipers, door locks and access control, and various comfort controls. The BCM 222 may also operate as a gateway for bus and network interfaces to interact with remote ECUs (not shown in FIG. 2).

The DAT controller 230 may provide Level-1 through Level-3 automated driving and driver assistance functionality that can include, for example, active parking assistance, vehicle backup assistance, adaptive cruise control, and/or lane keeping, among other features. The DAT controller 230 may also provide aspects of user and environmental inputs usable for user authentication.

In some aspects, the automotive computer 210 may connect with an infotainment system 240. The infotainment system 240 may include a touchscreen interface portion, and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion, and/or display notifications (including visual alert notifications), navigation maps, etc. on the touchscreen interface portion.

The vehicle 202 may further include the camera 110 and the display screen 114, as described in conjunction with FIG. 1. The automotive computer 210 and/or the obstruction detection system 214 may control rotational movement of the camera 110 via the BCM 222.

The computing system architecture of the automotive computer 210, the VCU 212, and/or the obstruction detection system 214 may omit certain computing modules. It should be readily understood that the computing environment depicted in FIG. 2 is an example of a possible implementation according to the present disclosure, and thus, it should not be considered limiting or exclusive.

In accordance with some aspects, the obstruction detection system 214 may be integrated with and/or executed as part of the ECUs 216. The obstruction detection system 214, regardless of whether it is integrated with the automotive computer 210 or the ECUs 216, or whether it operates as an independent computing system in the vehicle 202, may include a transceiver 242, a processor 244, and a computer-readable memory 246.

The transceiver 242 may be configured to receive information/inputs from one or more external devices or systems, e.g., the user device 204, the server(s) 206, and/or the like via the network 208. Further, the transceiver 242 may transmit notifications (e.g., alert/alarm signals) to the external devices or systems. In addition, the transceiver 242 may be configured to receive information/inputs from vehicle components such as the infotainment system 240, the vehicle sensory system 234 (including the steering wheel sensors), and/or the like. Further, the transceiver 242 may transmit notifications (e.g., alert/alarm signals) to the vehicle components such as the infotainment system 240, the BCM 222, the display screen 114, etc.

The processor 244 and the memory 246 may be same as or similar to the processor 218 and the memory 220, respectively. In some aspects, the processor 244 may be an AI based processor that may utilize the memory 246 to store programs in code and/or to store data for performing aspects in accordance with the disclosure. The memory 246 may be a non-transitory computer-readable memory storing the obstruction detection code. In some aspects, the memory 246 may additionally store information associated with the vehicle 202 and one or more sensory inputs received from the vehicle sensory system 234. In additional aspects, the memory 246 may store the AI based image processing algorithms that the vehicle 202 may receive (via the transceiver 242) from the server 206. As described above, the AI based image processing algorithms may facilitate the processor 244 to analyze the images obtained from the camera 110 and determine one or more obstacles that may be visible in the images (i.e., obstacles that may be present on the curve 106, which may be occluded from the driver FOV).

In operation, the driver 104 may be navigating the curve 106 and may rotate the steering wheel 112 in the counterclockwise direction (when the curve 106 may be a left side curve). Responsive to the driver 104 rotating the steering wheel 112, the steering wheel sensors may detect the steering wheel rotation and generate a trigger signal when the steering wheel sensors detect that the driver 104 may have rotated the steering wheel 112 in the counterclockwise direction. In some aspects, the steering wheel sensors may generate the trigger signal when the driver 104 rotates the steering wheel 112 in the counterclockwise direction if the vehicle 102 is a left hand drive vehicle. The steering wheel sensors may generate the trigger signal when the driver 104 rotates the steering wheel 112 in the clockwise direction if the vehicle 202 is a right hand drive vehicle.

A person ordinarily skilled in the art may appreciate that the vertical body-mounted pillar 108 obstructs the driver's FOV when the driver 104 rotates the steering wheel 112 in the counterclockwise direction (i.e., when the vehicle navigates a left side curve) and the vehicle 202 is a left hand drive vehicle. Therefore, in a left hand drive vehicle, the steering wheel sensors generate the trigger signal when the driver 104 rotates the steering wheel 112 in the counterclockwise direction. In a similar manner, a vertical body-mounted pillar may obstruct the driver's FOV when the driver 104 rotates the steering wheel 112 in the clockwise direction and the vehicle 202 is a right hand drive vehicle. Therefore, in a right hand drive vehicle, the steering wheel sensors generate the trigger signal when the driver 104 rotates the steering wheel 112 in the clockwise direction.

Responsive to generating the trigger signal, the steering wheel sensors may transmit the trigger signal to the transceiver 242. The transceiver 242 may receive the trigger signal and may send the trigger signal to the processor 244. The processor 244 may obtain the trigger signal from the transceiver 242 and activate the camera 110 responsive to obtaining the trigger signal. Stated another way, the processor 244 may activate the camera 110 when the driver 104 rotates the steering wheel 112 in the counterclockwise direction (or clockwise direction if the vehicle 202 is a right hand drive vehicle).

Figure 4:
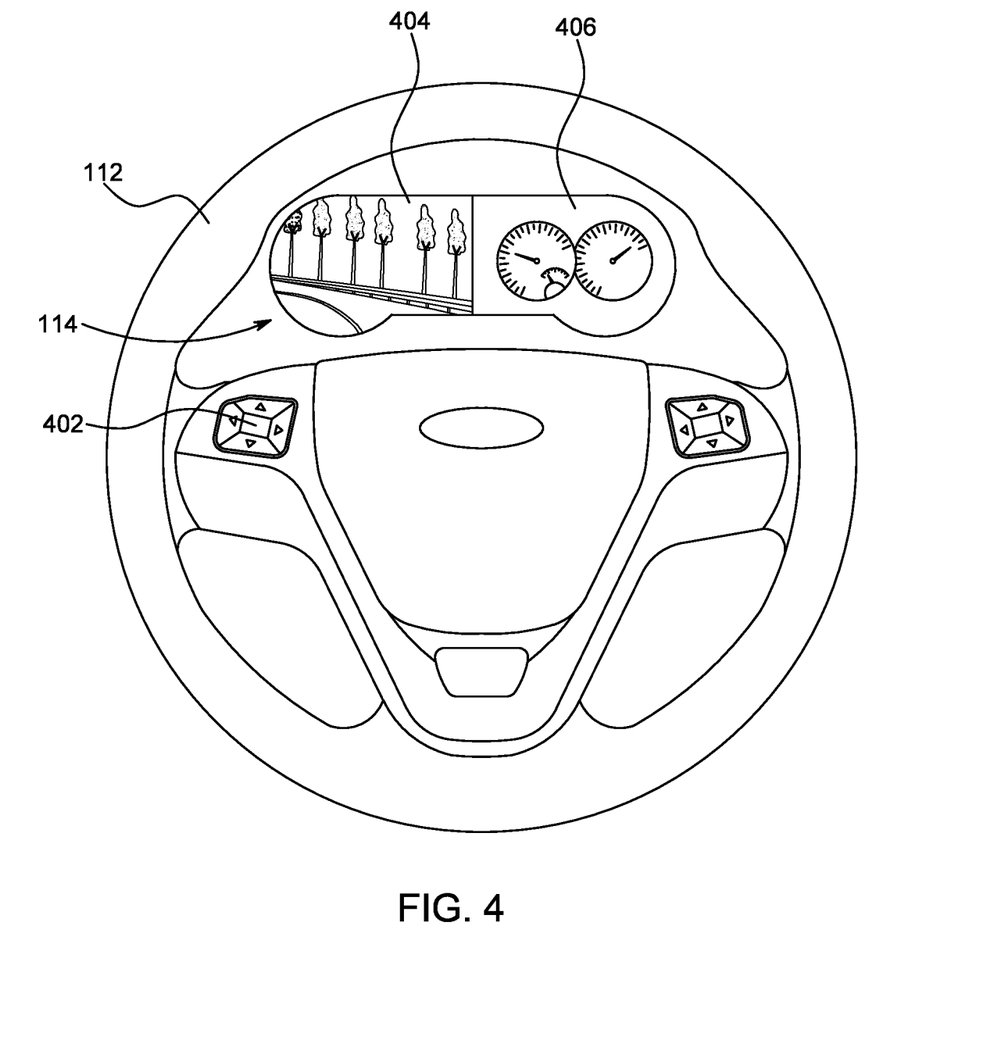
FIG. 4 depicts a snapshot of an example display screen of a vehicle cockpit in accordance with the present disclosure.

Although the description above describes an aspect where the steering wheel sensors generate and transmit the trigger signal to the processor 244 (via the transceiver 242), in some aspects, the processor 244 may obtain the trigger signal from other devices or units. For example, the processor 244 may obtain the trigger signal from the user device 204 or the infotainment system 240. In this case, the driver 104 may transmit the trigger signal (or a "camera activation signal") from the user device 204 or the infotainment system 240 to the processor 244 when the driver 104 desires to activate the camera 110. As another example, the processor 244 may obtain the trigger signal from a dedicated camera actuator 402 that may be disposed on the steering wheel 112 (as shown in FIG. 4) or any other location in the vehicle 202. The camera actuator 402 may be configured to generate the trigger signal and transmit the trigger signal to the processor 244, when the driver 104 presses or actuates the camera actuator 402 to activate the camera 110.

Responsive to camera activation, the camera 110 may capture images of a geographical area in front of the vehicle 202. Specifically, the camera 110 may be configured to capture images of a geographical area that may be occluded from the driver FOV caused by the presence of the vertical body-mounted pillar 108 when the vehicle 202 traverses the curve 106. Responsive to capturing the images, the camera 110 may transmit the images to the processor 244, via the transceiver 242.

The processor 244 may obtain the images from the camera 110 and may analyze the obtained images based on the AI based image processing algorithms that may be stored in the memory 246. In some aspects, the processor 244 may analyze the images to determine an end of the curve 106 (or a "curve end") in the obtained images. Responsive to determining the curve end, the processor 244 may control camera rotation based on the determined curve end. As described above in conjunction with FIG. 1, the camera 110 may be a one degree of freedom rotational camera that may be configured to rotate laterally.

In some aspects, the processor 244 may control the camera rotation such that camera focus is aligned with the determined curve end when the vehicle 202 traverses the curve 106. Stated another way, the processor 244 may control camera rotation such that the camera 110 continuously "follows" the curve end as the vehicle 202 navigates the curve 106.

Figure 3:
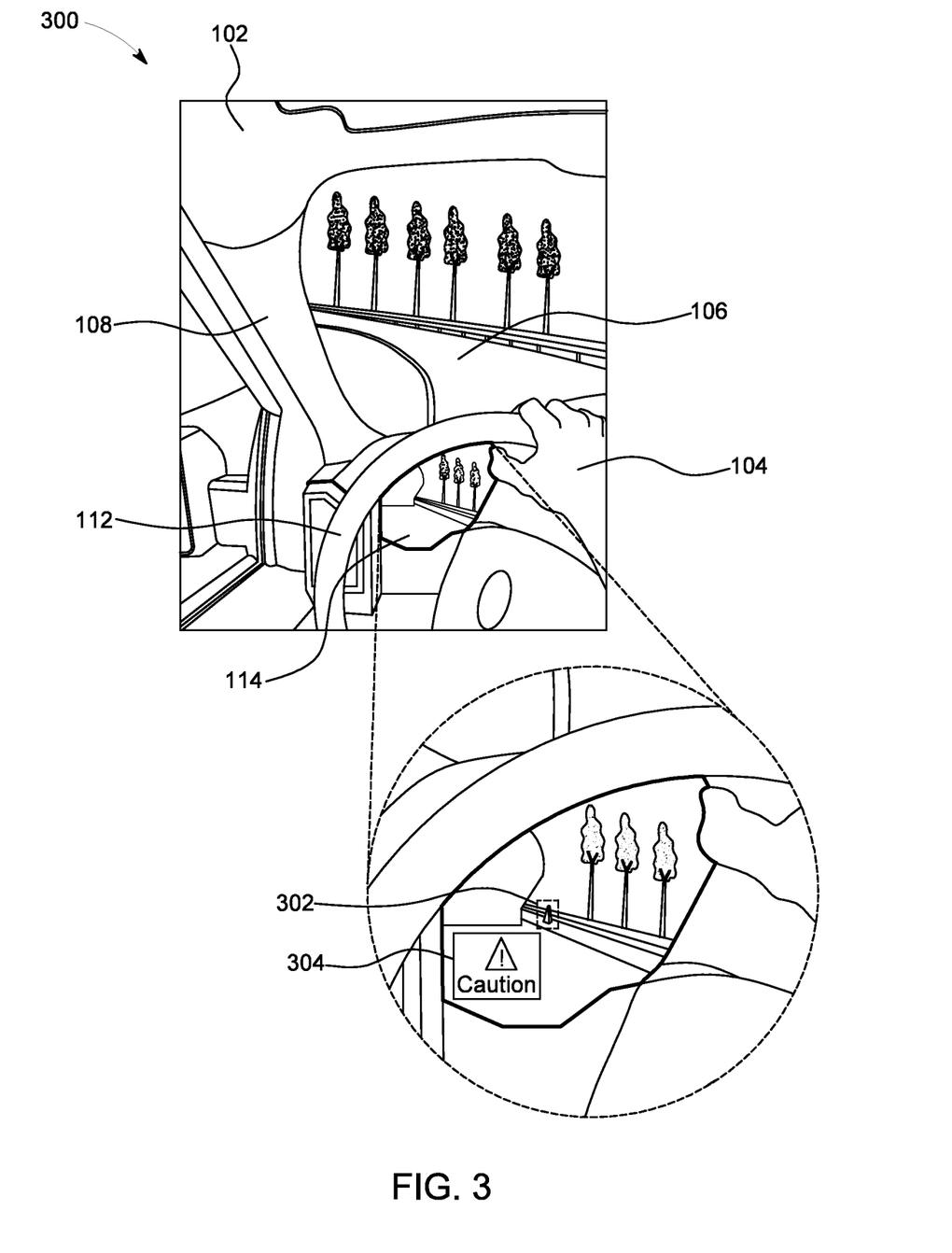
FIG. 3 depicts an example image of a road curve being displayed on a display screen in accordance with the present disclosure.

In addition to controlling the camera rotation, the processor 244 may cause the display screen 114 to display the images obtained from the camera 110. An example view of an image of the curve 106 being displayed on the display screen 114 is shown in FIG. 3. In some aspects, the processor 244 may first process the images obtained from the camera 110 to enhance image quality/resolution (e.g., by removing blur, etc.), before displaying the images on the display screen 114. In this manner, an "enhanced image" may be displayed on the display screen 114.

Since the camera 110 focuses on the curve end, the curve end is disposed at a center portion of the image that may be displayed on the display screen 114. Positioning the curve end at an image center portion enables the driver 104 to view a substantial portion of the geographical area in front of the vehicle 202 that may be occluded from the driver FOV by the vertical body-mounted pillar 108.

Although the description above describes an aspect where the processor 244 causes the camera 110 to focus on the curve end, in other aspects, the processor 244 may cause the camera 110 to focus on other road portions in front of the vehicle 202. For example, in some aspects, the processor 244 may cause the camera 110 to focus on a road center portion in front of the vehicle 202.

Furthermore, in some aspects, the display screen 114 may have two separate portions or sections, e.g., a left screen portion 404 and a right screen portion 406, as shown in FIG. 4. For a left hand drive vehicle (e.g., the vehicle 202), the left screen portion 404 may be configured to display the images captured by the camera 110, as shown in FIG. 3. This display screen arrangement may facilitate the driver 104 to view the images conveniently, when the driver 104 rotates the steering wheel 112 in the counterclockwise direction. The right screen portion 406 may be configured to display other vehicle details, e.g., vehicle speed, etc., as shown in FIG. 4.

For a right hand drive vehicle, the display screen arrangement described above may be opposite. For example, in a right hand drive vehicle, the right screen portion 406 may display the images captured by the camera 110 and the left screen portion 404 may display the other vehicle details.

In further aspects, in addition to controlling camera rotation and causing the display screen 114 to display images captured by the camera 110, the processor 244 may analyze the images obtained from the camera 110 (e.g., by using the AI based image processing algorithms) and determine one or more obstructions that may be present on the curve 106. Specifically, the processor 244 may determine presence of obstructions or obstacles that may be present in the geographical area occluded from the driver FOV, based on the analysis of the images obtained from the camera 110.

Responsive to determining a presence of an obstacle (e.g., an obstacle 302, as shown in FIG. 3), the processor 244 may output a visual alert notification 304 on the display screen 114. Specifically, the processor 244 may generate an Augmented Reality (AR) image in which the visual alert notification 304 may be overlaid on the images captured by the camera 110. The obstacle 302 may be further highlighted in the AR image. The processor 244 may then render the generated AR image on the display screen 114, as shown in FIG. 3. In additional aspects, responsive to determining presence of the obstacle 302 on the curve 106, the processor 244 may output an audible alert via a vehicle speaker system (not shown) and/or the infotainment system 240. In further aspects, the processor 244 may transmit, via the transceiver 242, the alert to the user device 204.

Responsive to viewing the visual alert notification 304 on the display screen 114 and/or hearing the audible alert, the driver 104 may perform a remedial action. For example, the driver 104 may apply brakes, decrease vehicle speed, etc., responsive to viewing or hearing the alert notification. In this manner, the present disclosure assists the driver 104 in detecting obstructions or obstacles that may be present in the blind spot or the geographical area in front of the vehicle 202 that may be occluded from the driver FOV (e.g., due to the presence of the vertical body-mounted pillar 108) and timely perform remedial actions.

Although the description above describes an aspect where the camera 110 is used to capture geographical area images in front of the vehicle 202 that may be occluded from the driver FOV, in some aspects, the driver 104 may additionally use the camera 110 to capture images of vehicle surroundings. For example, when the driver 104 may be on a road trip and desires to capture images of vehicle surroundings, the driver 104 may activate the camera 110 by actuating the camera actuator 402. The driver 104 may further transmit, via the user device 204, instructions to the processor 244 to rotate the camera 110 at a rotation angle desired by the driver 104, so that the camera 110 may capture images of vehicle surrounding (and not of the curve 106). Responsive to camera activation and obtaining instructions from the user device 204, the processor 244 may rotate the camera 110 at the rotation angle desired by the driver 104. The camera 110 may then capture images of vehicle surrounding. In this case, the images captured by the camera 110 may be stored in the memory 246 and/or transmitted, via the transceiver 242, to the user device 204 (or any other device) or cloud for storage purpose.

Figure 5:
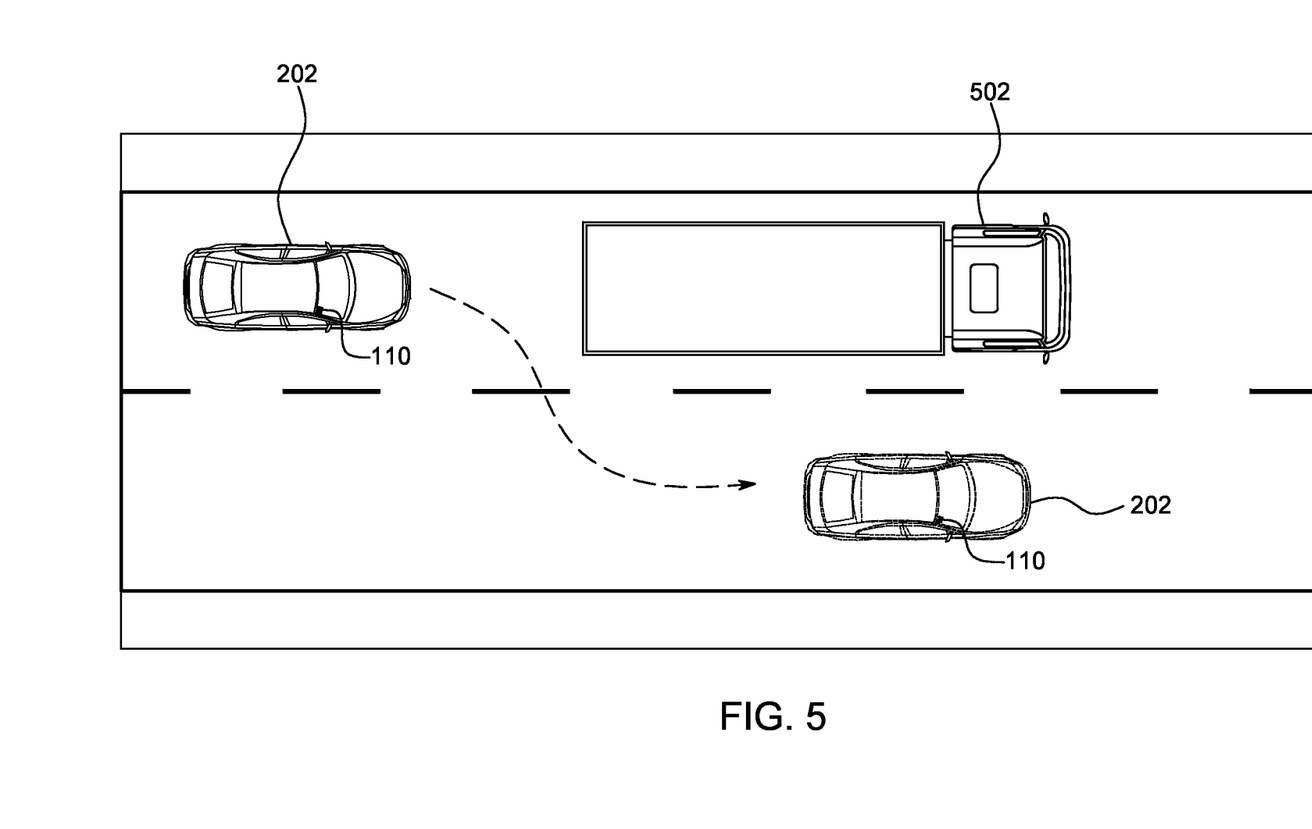
FIG. 5 depicts an example scenario of a vehicle changing lanes in accordance with the present disclosure.

In additional aspects, the driver 104 may use the images obtained by the camera 110 when the vehicle 202 may be changing lanes, as shown in FIG. 5. Specifically, when the driver 104 desires to change lanes and the driver's view may be obstructed by an obstacle (e.g., a large vehicle 502, as shown in FIG. 5), the driver 104 may activate the camera 110 by actuating the camera actuator 402. The driver 104 may further transmit, via the user device 204, instructions to the processor 244 to rotate the camera 110 at a rotation angle desired by the driver 104, so that the camera 110 may capture images of right side of the vehicle 502 (that may be occluded from the driver's FOV). Responsive to camera activation and obtaining instructions from the user device 204, the processor 244 may rotate the camera 110 at the rotation angle desired by the driver 104 and display the images captured by the camera 110 on the display screen 114. The driver 104 may view the images on the display screen 114 and conveniently change lanes. In this manner, the present disclosure may additionally assist the driver 104 in changing lanes.

Figure 6:
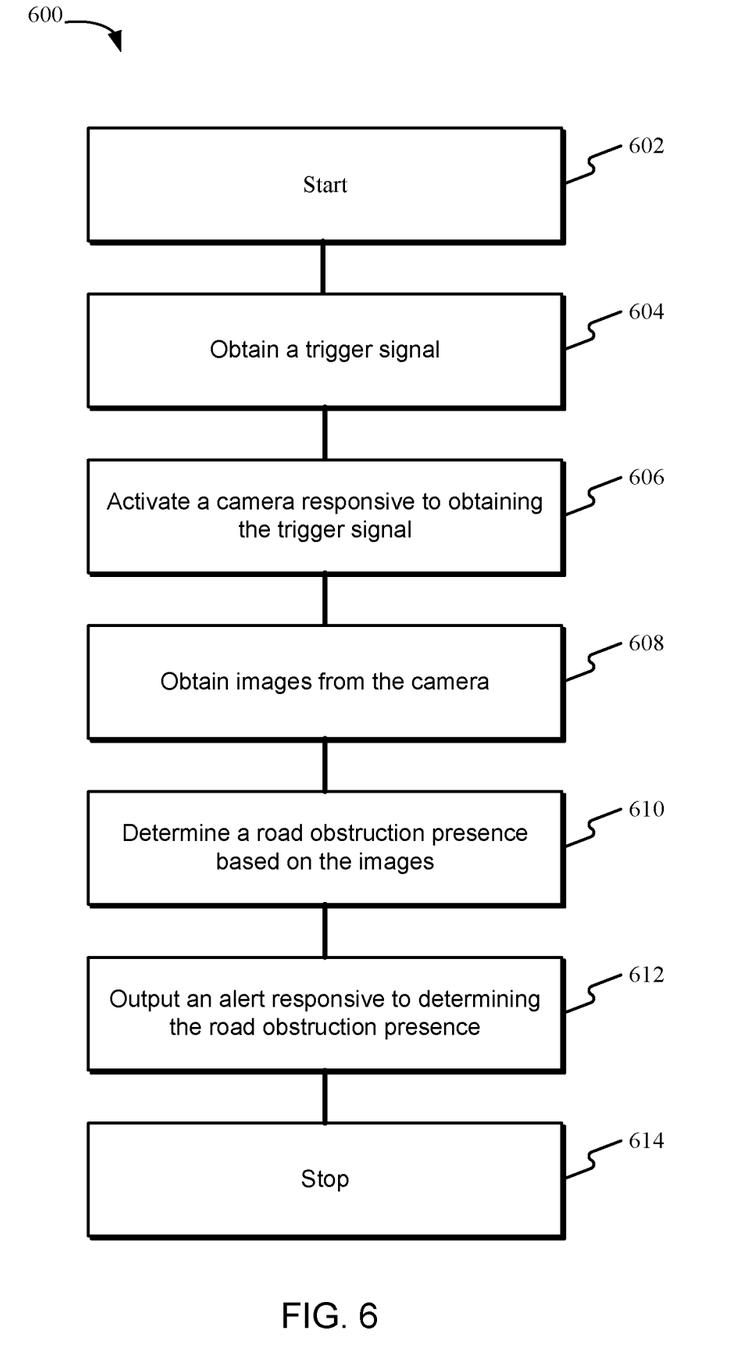
FIG. 6 depicts a flow diagram of an example method for detecting road obstructions in accordance with the present disclosure.

FIG. 6 depicts a flow diagram of an example method 600 for detecting road obstructions in accordance with the present disclosure. FIG. 6 may be described with continued reference to prior figures. The following process is exemplary and not confined to the steps described hereafter. Moreover, alternative embodiments may include more or less steps that are shown or described herein and may include these steps in a different order than the order described in the following example embodiments.

The method 600 starts at step 602. At step 604, the method 600 may include obtaining, by the processor 244, the trigger signal. As described above in conjunction with FIG. 2, the processor 244 may obtain the trigger signal from the steering wheel sensors, the user device 204, the infotainment system 240, or the camera actuator 402.

At step 606, the method 600 may include activating, by the processor 244, the camera 110 responsive to obtaining the trigger signal. At step 608, the method 600 may include obtaining, by the processor 244, the images captured by the camera 110 responsive to camera activation. At step 610, the method 600 may include determining, by the processor 244, presence of the obstacle 302 in the curve 106 based on the obtained images. At step 612, the method 600 may include outputting, by the processor 244, an alert responsive to determining the obstacle presence.

The method 600 may end at step 614.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a camera disposed at a vehicle front portion, wherein the camera is configured to capture images of a geographical area that is occluded from a driver field of view caused by a presence of a vehicle structural component when the vehicle traverses a road curve, and wherein the camera is further configured to continuously focus on an end of the road curve as the vehicle traverses the road curve;
   a display; and
   a processor communicatively coupled with the camera, wherein the processor is configured to:
      obtain a trigger signal;
      activate the camera responsive to obtaining the trigger signal;
      obtain the images from the camera responsive to activating the camera;
      determine a road obstruction presence in the geographical area based on applying an Artificial Intelligence (AI) based image processing algorithm to analyze the images;
      generate an Augmented Reality (AR) image by overlaying a visual alert notification on the images captured by the camera, responsive to determining the road obstruction presence; and
      display the AR image upon the display,
   wherein the vehicle structural component is a vehicle vertical body-mounted pillar, and
   wherein the vehicle is a left-hand drive vehicle, and further comprising:
      a steering wheel; and
      a steering wheel sensor configured to:
         detect steering wheel rotation;
         generate the trigger signal when the steering wheel is rotated in an anticlockwise direction that causes the vertical body-mounted pillar to obstruct the driver field of view; and
         transmit the trigger signal to the processor.

2. The vehicle of claim 1, wherein the processor obtains the trigger signal from a user device, a vehicle infotainment system, or a camera actuator.

3. The vehicle of claim 1 further comprising a vehicle cockpit comprising a display screen.

4. The vehicle of claim 3, wherein the processor is further configured to cause the display screen to display the images.

5. The vehicle of claim 1, wherein the camera is a one degree of freedom rotational camera.

6. The vehicle of claim 5, wherein the processor is further configured to:
   determine a road curve end based on the images; and
   control camera rotation angle such that a camera focus is aligned with the road curve end when the vehicle traverses the road curve.

7. A vehicle comprising:
   a camera disposed at a vehicle front portion, wherein the camera is configured to capture images of a geographical area that is occluded from a driver field of view caused by a presence of a vehicle structural component when the vehicle traverses a road curve, and wherein the camera is further configured to continuously focus on an end of the road curve as the vehicle traverses the road curve;

a display; and a processor communicatively coupled with the camera, wherein the processor is configured to:

obtain a trigger signal;

activate the camera responsive to obtaining the trigger signal;

obtain the images from the camera responsive to activating the camera;

determine a road obstruction presence in the geographical area based on applying an Artificial Intelligence (AI) based image processing algorithm to analyze the images;

generate an Augmented Reality (AR) image by overlaying a visual alert notification on the images captured by the camera, responsive to determining the road obstruction presence; and display the AR image upon the display, wherein the vehicle structural component is a vehicle vertical body-mounted pillar, and wherein the vehicle is a right-hand drive vehicle, and further comprising:

a steering wheel; and a steering wheel sensor configured to:

detect steering wheel rotation;

generate the trigger signal when the steering wheel is rotated in a clockwise direction that causes the vertical body-mounted pillar to obstruct the driver field of view; and transmit the trigger signal to the processor.

8. The vehicle of claim 7, wherein the processor obtains the trigger signal from a user device, a vehicle infotainment system, or a camera actuator.

9. The vehicle of claim 7 further comprising a vehicle cockpit comprising a display screen.

10. The vehicle of claim 9, wherein the processor is further configured to cause the display screen to display the images.

11. The vehicle of claim 7, wherein the camera is a one degree of freedom rotational camera.

12. The vehicle of claim 11, wherein the processor is further configured to:

determine a road curve end based on the images; and control camera rotation angle such that a camera focus is aligned with the road curve end when the vehicle traverses the road curve.

* * * * *